UNITED STATES PATENT OFFICE.

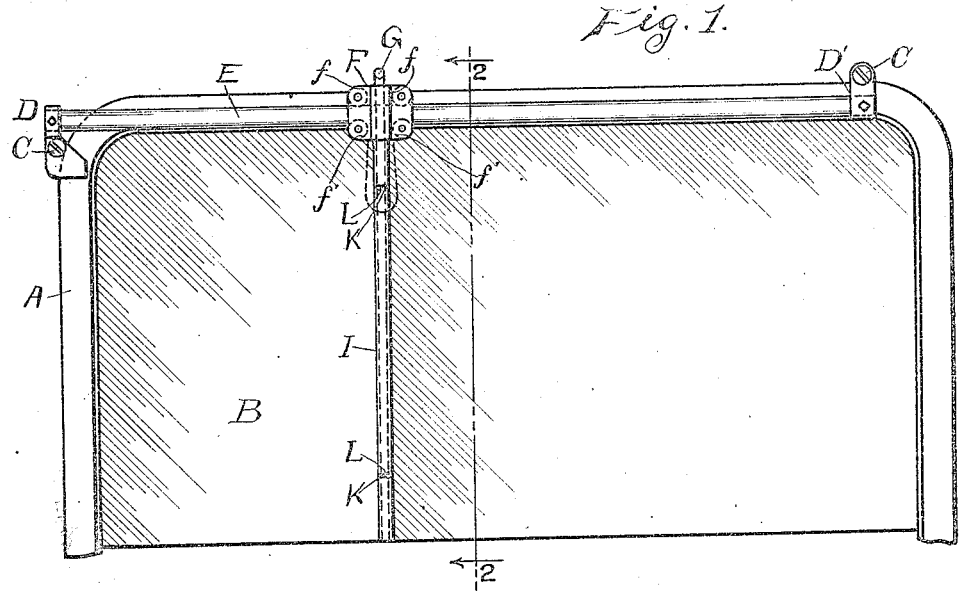
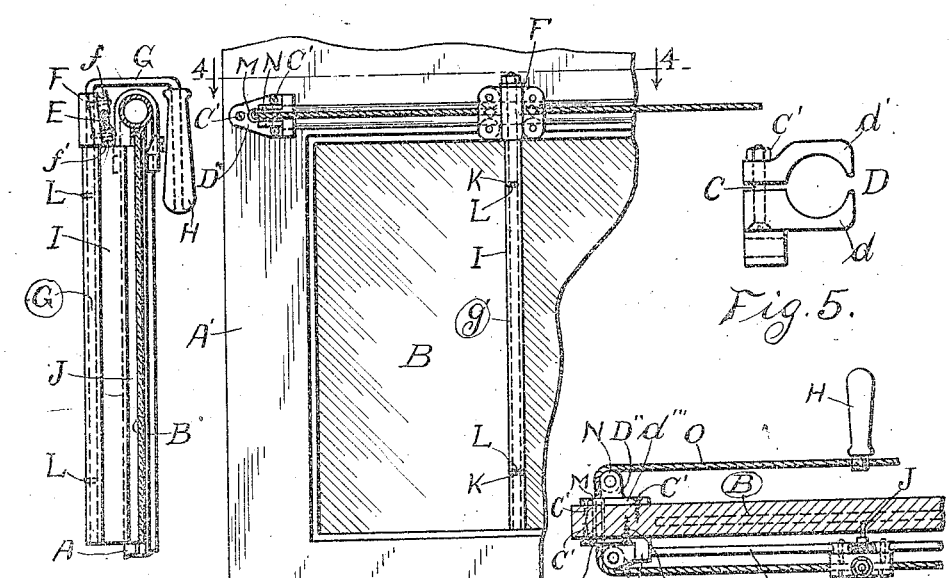

JOHN W. CAIN, OF CHICAGO, ILLINOIS.

WIPER FOR AUTOMOBILE WIND-SHIELDS AND THE LIKE.

1,289,647.

Specification of Letters Patent.

Patented Dec. 31, 1918.

Application filed September 4, 1917. Serial No. 189,519.

*To all whom it may concern:*

Be it known that I, JOHN W. CAIN, a citizen of the United States, and a resident of Chicago, in the county of Cook and State of Illinois, have invented certain new and useful Improvements in Wipers for Automobile Wind-Shields and the like, of which the following is a specification.

This invention relates to a device which enables the chauffeur of an automobile, either touring, limousine or truck, to remove or wipe from the glass of the wind shield of the machine, water (as rain), snow, or dirt without moving from his seat at the wheel and without seriously interfering with his control of the machine.

The objects of the invention are to obtain a device which is easily installed, readily understood and operated, and which is economically made.

Additional objects are to obtain a device which is effective in operation, durable, and not liable to break or get out of order.

The drawings accompanying and forming a part hereof illustrate constructions embodying the invention, and in said drawing, Figure 1, is a front elevation of one of said constructions attached to the wind shield of an automobile touring car; and Fig. 2, a vertical section on line 2—2 of Fig. 1, viewed in the direction indicated by the arrows.

Fig. 3, is a front elevation of one end of a construction embodying the invention, in a modified form, and one end of the wind shield of a limousine or truck to which said construction is attached;

Fig. 4, is a horizontal section on line 4—4 of Fig. 3 viewed in the direction indicated by the arrows; and Fig. 5, is a plan view of a bracket forming an element in the construction which is illustrated in Figs. 1 and 2.

A reference character applied to designate a given part indicates said part throughout the several figures of the drawing wherever the same appears.

A represents the frame of an automobile wind shield as the same is usually constructed for touring cars and B the glass in said frame. D, D', represent brackets attached to frame A by bolts C and nuts C'. The brackets D, D', respectively consist of parts $d$, $d'$, which are placed one on the front and one on the back side of frame A; and the manner of securing said bracket to said frame is by drawing said parts closely to the frame by said bolt C and locking said bolt in position by said nut C'. E represents a rod or tube which is secured in bracket D, D'. F, represents a carriage which is provided with rotatably mounted rollers $f$, $f$, adapted to travel on the upper side of rod or tube E, and with the additional rollers $f'$, $f'$, which are adapted to travel closely adjacent to the under side of said rod or tube E. G, Figs. 1 and 2, represents a rod which is loosely mounted in carriage F. The rod G is curved, and one end thereof is provided with a handle H, with the other end thereof extending vertically below the carriage F to, say, near the lower edge of glass B, and in front of said glass. I represents a wiper frame which is loosely mounted on the vertical portion, ($g'$) of the rod G, said vertical portion forming a base for said frame. J represents a wiper in frame I. The frame I being mounted on rod G and said rod being mounted in carriage F, all said parts or members are movable on the rod or tube E by means of the handle H. When said members are moved in a given direction, by means of the handle H, the frame I may turn on rod G so that the wiper J drags on the glass B, the limit of said turning being controlled by slots K in said frame and pins L which extend through said slots and are rigidly secured in a vertically extending portion $g'$ of said rod G.

In the construction illustrated in Figs. 3 and 4 the parts $d''$, and $d'''$ of the two part bracket, D'', are illustrated as secured to the frame A', which is usually of wood, by the screws C' the said screws entering the wood and not requiring nuts thereon (see Fig. 4).

In this construction the parts $d''$, $d'''$ of the bracket (D'') are respectively provided with an aperture M; and N, N, represent rollers which are rotatably mounted on said bracket. O represents a flexible member, as a metal cord or wire rope, which extends over the rollers or pulleys N, through the aperture M and is attached at its ends to the carriage F. The two part bracket D'' at each end of the frame A' are duplicates and hence the one at the left hand end of said frame, as viewed in Figs. 3 and 4, is the only illustration of said bracket which occurs in the drawing.

In the construction which is illustrated in Figs. 1 and 2, the rod or tube E may be flattened in cross section as is illustrated in Fig. 2, and in the construction illustrated in Figs. 3 and 4 the flat form or shape of said rod or tube is utilized to maintain the carriage F in position to maintain part g' of rod G in place to force the wiper J against glass B, as carriage F is moved on said rod or tube E. In the construction illustrated in Figs. 1 and 2 the hands grasping the handle H may draw said handle to the right as viewed in Fig. 2, thus varying the pressure of the wiper J on glass B without requiring the rollers f, f' of carriage F to fit so closely to rod E as to maintain the rod G and frame I in position as last above described for the construction illustrated in Figs. 3 and 4, and for the purpose set forth.

Duplicate brackets D (but rights and lefts) may be used, one thereof being substituted for bracket D' in the construction which is illustrated in Figs. 1 and 2; said bracket D' being used to permit the installation of the device on cars having different lengths of wind shield frames without changing the length of rod or tube E; the position of said bracket D' on the top rail of frame A being determined by the length of said tube or rod.

Tube or rod E forms a track for the rollers f, f' of carriage F. The vertical part g' of rod G forms a base on which the wiper frame I is mounted.

To operate the device the handle H is seized and moved to move carriage F, carrying rod G and frame I so that the wiper J will clean the wind shield.

When not in use the carriage F may be moved adjacent to the bracket D in the construction illustrated in Figs. 1 and 2, and to brackets D'' in the construction illustrated in Figs. 3 and 4.

I claim:

1. In a windshield cleaner adapted to be mounted on the frame of a windshield, the combination of a track, means to attach one end of said track to an end rail of said frame to position said end of said track beyond the end of the windshield and means to attach the other end of said track to the top rail of said frame, said attaching means coöperative to position said track in a plane parallel to the plane of said frame, a carriage mounted on said track and adapted to move longitudinally thereon, and a wiper on said carriage.

2. In a windshield cleaner adapted to be mounted on the frame of a windshield, the combination of a track flattened on the sides thereof, means to attach said track to said frame, said means comprising brackets in which said track is secured to position said track in front of said frame, a carriage provided with grooved rollers engaging opposite edges of said track and adapted to move longitudinally thereon, a U-shaped rod mounted on said carriage so that one leg thereof will extend in front of said windshield and a wiper on said leg, and one leg thereof will extend back of said windshield and a handle on said last named leg, whereby said wiper may be forced against said windshield by the said securing of said flattened track in said brackets, and moved by said handle thereover to clean the same.

JOHN W. CAIN.

In the presence of—
CHARLES TURNER BROWN.
JOHN T. LAVIN.